US012802203B2

(12) United States Patent
Liu et al.

(10) Patent No.: US 12,802,203 B2
(45) Date of Patent: Nov. 17, 2026

(54) FUSION-BASED DIGITAL IMAGE CORRELATION FRAMEWORK FOR STRAIN MEASUREMENT

(71) Applicants: Mitsubishi Electric Research Laboratories, Inc.; Mitsubishi Electric Corporation

(72) Inventors: Dehong Liu, Lexington, MA (US); Laixi Shi, Pittsburgh, PA (US); Masaki Umeda, Tokyo (JP); Norihiko Hana, Tokyo (JP)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 440 days.

(21) Appl. No.: 17/148,609

(22) Filed: Jan. 14, 2021

(65) Prior Publication Data

US 2022/0114713 A1 Apr. 14, 2022

Related U.S. Application Data

(60) Provisional application No. 63/091,491, filed on Oct. 14, 2020.

(51) Int. Cl.

| | |
|---|---|
| ***G06T 7/00*** | (2017.01) |
| ***G06T 3/4038*** | (2024.01) |
| ***G06T 5/73*** | (2024.01) |
| ***G06T 7/70*** | (2017.01) |

(52) U.S. Cl.
CPC ............ *G06T 7/001* (2013.01); *G06T 3/4038* (2013.01); *G06T 5/73* (2024.01); *G06T 7/70* (2017.01);

(Continued)

(58) Field of Classification Search
CPC . G06T 2207/30108; G06T 2207/30132; G06T 7/001; G06T 2207/10016;

(Continued)

(56) References Cited

U.S. PATENT DOCUMENTS

| | | | | |
|---|---|---|---|---|
| 2014/0037217 A1* | 2/2014 | Iliopoulos | G01B 11/16 | 382/201 |
| 2015/0248916 A1* | 9/2015 | Kopf | G06T 7/557 | 386/278 |

OTHER PUBLICATIONS

Guo et al., "Dynamic deformation image de-blurring and image processing for digital imaging correlation measurement", Jun. 2017, Elsevier, Optics and Lasers in Engineering, vol. 98, p. 23-30. (Year: 2017).*

(Continued)

*Primary Examiner* — Vincent Rudolph
*Assistant Examiner* — Timothy Choi
(74) *Attorney, Agent, or Firm* — Gene Vinokur

(57) ABSTRACT

Provided is a two-dimensional digital image correlation (DIC) framework for strain measurement on large three-dimensional objects. The DIC framework incorporates image fusion principles to achieve full-field strain measurement over the curved surface. With a sequence of blurry images as inputs, sharp images are recovered using blind deconvolution, then the recovered sharp images are projected to the curved surface using camera poses estimated by a perspective-n-point (PnP) method using a refined robust weighted Levenberg Marquardt (RRWLM) algorithm. Images on the curved surface are stitched and then unfolded for strain analysis using DIC.

20 Claims, 10 Drawing Sheets

(52) U.S. Cl.
CPC ............... *G06T 2207/10016* (2013.01); *G06T 2207/30108* (2013.01); *G06T 2207/30244* (2013.01)

(58) Field of Classification Search
CPC ... G06T 2207/30244; G06T 7/70; G06T 7/73; G06T 7/74; G06T 7/77; G06T 2200/32; G06T 3/4038; G06T 5/003; G01M 11/081
See application file for complete search history.

(56) References Cited

OTHER PUBLICATIONS

An et al., "Unified framework for automatic image stitching and rectification", Jun. 2015, SPIE, Journal of Electronic Imaging vol. 24, No. 3, p. 033007-1-033007-11. (Year: 2015).*
Zhao et al., "Accurate and robust feature-based homography estimation using Half-Sift and feature localization error weighting", Jul. 2016, Elsevier, Journal of Visual Communication and Image Representation, vol. 40, pt. A, p. 288-299. (Year: 2016).*
Forsberg et al., "3D deformation and strain analysis in compacted sugar using x-ray microtomography and digital vol. correlation", Jul. 2009, IOP Publishing, Measurement Science and Technology, vol. 20, No. 9, p. 1-8. (Year: 2009).*
Brown et al., "Automatic Panoramic Image Stitching using Invariant Features", Dec. 2006, Springer, International Journal of Computer Vision 74(1), p. 59-73. (Year: 2006).*
Zhang, "Flexible Camera Calibration By Viewing a Plane From Unknown Orientations", Sep. 1999, IEEE, Proceedings of the Seventh IEEE International Conference on Computer Vision, p. 1-8. (Year: 1999).*

* cited by examiner

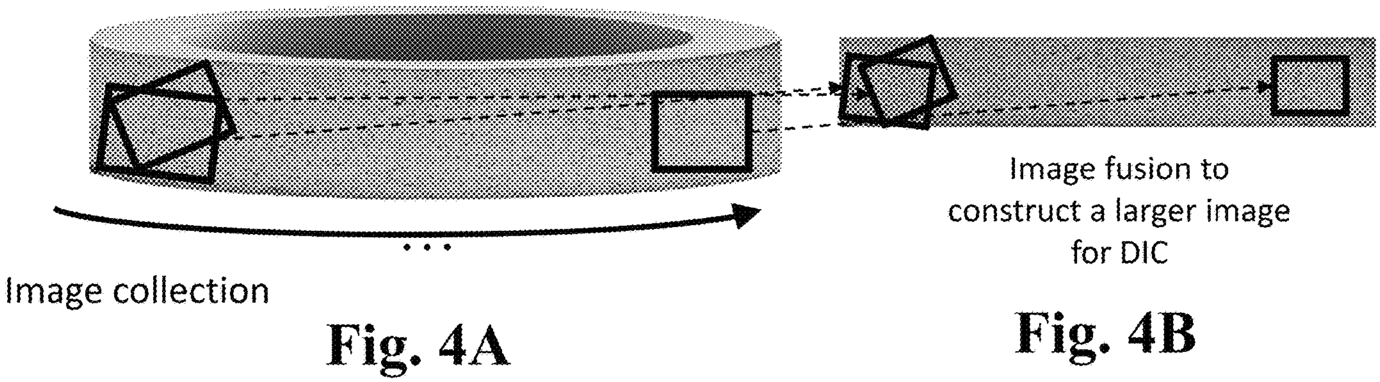
Fig. 4A
Fig. 4B
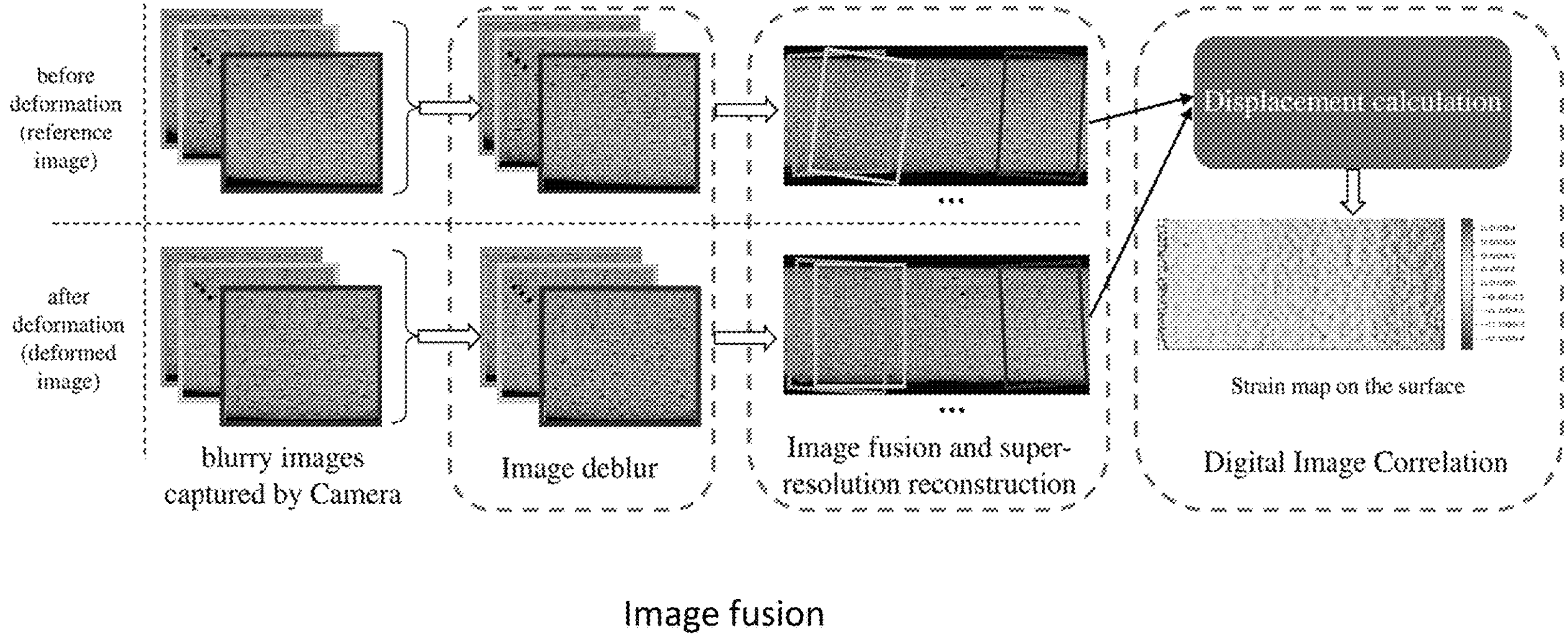
Fig. 4C

Algorithm 1: Refined robust weighted LM (RRWLM)

Input: Matching feature set $\{\cup_{j\in\mathcal{L}_i}\mathcal{A}_{(j,i)}\}_{i=2}^{p}$, initial poses $\{h_i = \hat{h}_i\}_{i=1}^{p}$, and parameters $N, \epsilon, L_1, L_2, c_1, c_2$;

```
for m ← 0 to M do
    for i ← 2 to p do
        Construct ∪_{j∈L_i} M_(j,i) = {(u_j^m, x_i^m)} from
            ∪_{j∈L_i} A_(j,i) using {h_j};
        Initial λ and h_i^(0) = h_i;
        for t ← 0 to N − 1 do
            Δh ← (H + λ diag(H))^(−1) b ;
            h_o ← P(h_i^(t) + Δh) ;
            Evaluate Δh:   ρ(h_o) =
                [g(h_i^(t) | ∪_{j∈L_i} M_(j,i)) − g(h_o | ∪_{j∈L_i} M_(j,i))] / [Δh^T · [λ diag(H) Δh + b]] ;
            if ρ(h_o) ≥ ε (h_o is good) then
                h_i^(t+1) ← h_o      λ = max[λ/L_1, c_1] ;
            else
                h_i^(t+1) ← h_i^(t)      λ = min[λ · L_2, c_2]
            end
        end
        Update h_i ← h_i^(N−1);
    end
end
Output: {h_i}_{i=1}^p.
```

Fig. 5

| Method | Average pose error | | PSNR of $\hat{U}'_b$ and $\hat{U}'_f$ | |
|---|---|---|---|---|
| | $\{X_i\}_{i=1}^{160}$ | $\{X_i\}_{i=1}^{10}$ | $\{X_i\}_{i=1}^{160}$ | $\{X_i\}_{i=1}^{10}$ |
| **LHM** | 40.67 | 0.15 | 11.86 | 30.63 |
| **EPnP+GN** | 34.23 | 0.18 | 11.91 | 30.63 |
| **OPnP+LM** | 29.35 | 0.12 | 12.53 | 30.67 |
| **RWLM** | 0.22 | 0.08 | 28.09 | 27.84 |
| **RRWLM** | 0.13 | 0.07 | 30.18 | 30.74 |

The average error of camera pose estimation and the PSNR of the image fusion results $\hat{U}'_b$ and $\hat{U}'_f$, using all 160 images or only the first 10 images in each sequence.

FIG. 6

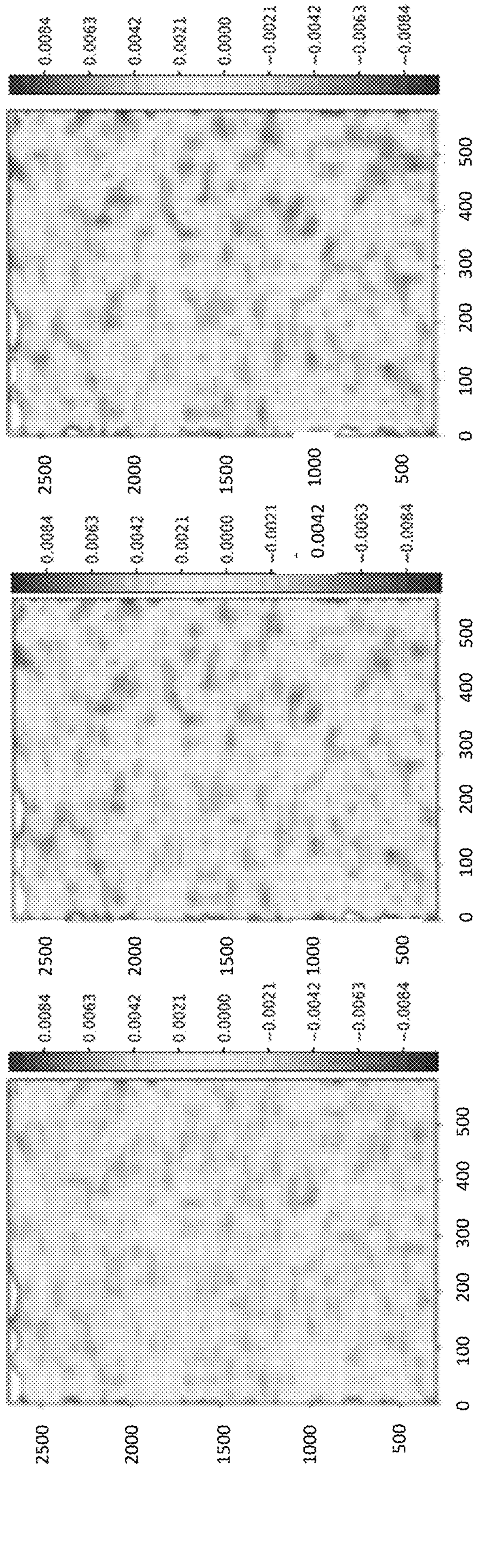
Fig. 7A True strain Fig. 7B RRWLM Fig. 7C OPnP+ LM
Comparison of strain maps of a small area using: (a) ideal surface images,(b)fused images by proposed RRWLM method, and (c) fused images of the best baseline result by OPnP+LM.

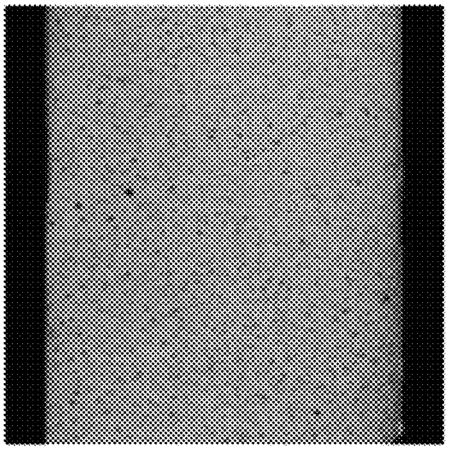
Fig. 8A $U_b$
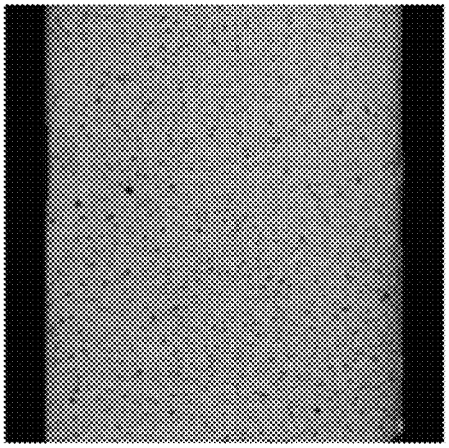
Fig. 8B RRWLM
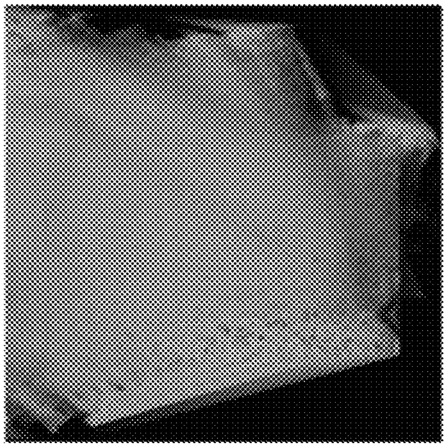
Fig. 8C OPnP + LM
Comparison of surface images: (a) ideal image $U_b$, (b) fused image $\hat{U}_b'$ by RRWLM, and (c) fused image $\hat{U}_b'$ by OPnP +LM.

(a) Strain using $U_b$ and $U_f$ (b) Strain via RRWLM fusion

Comparison of strain maps of a large area using (a) ideal surface images $U_b$ and $U_f$, and (b) fused images $\hat{U}'_b$ and $\hat{U}'_f$ by RRWLM.

FUSION-BASED DIGITAL IMAGE CORRELATION FRAMEWORK FOR STRAIN MEASUREMENT

FIELD OF THE INVENTION

The present invention is related generally to an apparatus and a method for fusion-based digital image correlation framework for strain measurement.

BACKGROUND & PRIOR ART

Strain measurement of materials subjected to loadings or mechanical damages is an essential task in various industrial applications. For strain measurement, aside from the widely used pointwise strain gauge technique, digital image correlation (DIC) as a non-contact and a non-interferometric optical technique attracts a lot of attention for its capability of providing full-field strain distribution of the surface using simple experimental setup. DIC is performed by comparing the digital gray intensity images of the surface before and after deformation, taking derivative of pixel displacement as a measure of strain at the pixel.

In various applications, it is of great interest to perform full field two-dimensional (2D) DIC analysis on the curved surface of large 3D objects. DIC has strict requirements on images taken before and after distortion for accurate pixel displacement, such as image resolution, image registration, and compensation of camera lens distortion, etc., since the displacements under strain are generally very subtle for most industrial materials. Therefore, the requirements in target scenarios lead to two daunting limitations for existing 2D DIC analysis. First, the DIC method is usually limited to 2D planar object surfaces rather than 3D curved surfaces. Second, the DIC method is usually restricted to small surfaces due to the very high pixel resolution requirement of images for DIC analysis. A lot of efforts have been made on 3D DIC methods based on a binocular stereo vision or a multi-camera system surrounding involving precise calibration and image stitching, which are difficult to operate in various scenarios.

This work stitches the images captured by a single ordinary moving camera rather than a well calibrated multi-camera system.

SUMMARY OF THE INVENTION

In our proposed framework, we incorporate image fusion and camera pose estimation to automatically stitch a large number of images of the curved surface under test. This work extends the range of applications based on image fusion and stitching to strain measurement in mechanical engineering.

The proposed framework decouples the image fusion problem into a sequence of well-known perspective-n-point (PnP) problems, which have been widely explored by using both non-iterative and iterative methods. Some are with extra outlier rejection or incorporate the observation uncertainty information. The proposed image fusion method combining the bundle adjustment principle and an iterative PnP method outperforms existing PnP methods and achieves applicable fusion accuracy.

The present disclosure addresses the problem of enabling two-dimensional digital image correlation (DIC) for strain measurement on large three-dimensional objects with curved surfaces. It is challenging to acquire full-field qualified images of the surface required by DIC due to the blur, distortion, and the narrow visual field of the surface that a single image can cover. To overcome this issue, we propose an end-to-end DIC framework incorporating image fusion principle to achieve full-field strain measurement over the curved surface. With a sequence of blurry images as inputs, we first recover sharp images using blind deconvolution, then project recovered sharp images to the curved surface using camera poses estimated by our proposed perspective-n-point (PnP) method called RRWLM. Images on the curved surface are stitched and then unfolded for strain analysis using DIC. Numerical experiments are conducted to validate our framework using RRWLM with comparisons to existing methods.

Some embodiments of the present invention propose an end-to-end fusion-based DIC framework to enable strain measurement along the 3D object curved surface in large size using a single camera. We first use a moving camera over the 3D large surface to acquire a sequence of 2D blurry images of the surface texture. With these blurry observations, we then recover the corresponding sharp images using blind deconvolution and project the pixels in them to the 3D surface using camera poses estimated by our proposed robust perspective-n-Point (PnP) method for image fusion. The stitched 3D surface images before and after deformation are unfolded to two 2D fused ones respectively, converting the 3D strain measurement into a 2D one for further DIC analysis. Since the displacements are subtle (typically sub-pixel) as mentioned before, their derivatives and corresponding strains are extremely sensitive to the fused image quality. Thus, the most daunting challenge in the pipeline is the stringent accuracy requirement (at least sub-pixel level) of the image fusion method for accurate strain measurement.

Further, according to some embodiments of the present invention, an image processing device for measuring strain of an object is provided. The image processing device includes an interface configured to acquire first sequential images and second sequential images, wherein two adjacent images of the first sequential images include first overlap portions, wherein two adjacent images of the second sequential images include second overlap portions, wherein the first sequential images correspond to a first three dimensional (3D) surface on the object at a first state and the second sequential images correspond to a second 3D surface on the object at a second state (first state may referred to as an initial condition and the second state may be a state after a period of time of operations); a memory to store computer-executable programs including an image deblurring method, a pose refinement method, a fused-base correlation method, a strain-measurement method, and an image correction method; and a processor configured to execute the computer-executable programs, wherein the processor performs steps of: deblurring the first sequential and second sequential images to obtain sharp focal plane images base on a blind kernel deconvolution method; stitching the sharpened first sequential images and the sharpened second sequential images into a first sharp 3D image and a second sharp 3D image based on camera pose estimations by solving a perspective-n-point (PnP) problem using a refined robust weighted Levenberg Marquardt (RRWLM) algorithm, respectively; forming a first two-dimensional (2D) image and a second 2D image by unfolding, respectively, the first sharp 3D image and the second sharp 3D; and generating a displacement (strain) map from the first 2D and second 2D images by performing a two-dimensional digital image correction (DIC) method.

Some embodiments of the present invention provide an end-to-end DIC framework incorporating image fusion to the strain measurement pipeline. It extends the range of DIC-based strain measurement applications to the curved surface of 3D objects in large size.

Further, an embodiment of the present invention provides an image processing method for measuring strain of an object. The image processing method may include acquiring first sequential images and second sequential images, wherein two adjacent images of the first sequential images include first overlap portions, wherein two adjacent images of the second sequential images include second overlap portions, wherein the first sequential images correspond to a first three dimensional (3D) surface on the object at a first state and the second sequential images correspond to a second 3D surface on the object at a second state; deblurring the first sequential and second sequential images to obtain sharp focal plane images based on a blind deconvolution method; stitching the sharpened first sequential images and the sharpened second sequential images into a first sharp 3D image and a second sharp 3D image based on camera pose estimations by solving a perspective-n-point (PnP) problem using a refined robust weighted Levenberg Marquardt (RRWLM) algorithm, respectively; forming a first two-dimensional (2D) image and a second 2D image by unfolding, respectively, the first sharp 3D image and the second sharp 3D; and generating a displacement (strain) map image from the first 2D and second 2D images by performing a two-dimensional digital image correction (DIC) method.

Yet, further, some embodiments of the present invention provide a non-transitory computer readable medium that comprises program instructions that causes a computer to perform a method. In this case, the method may include steps of acquiring first sequential images and second sequential images, wherein two adjacent images of the first sequential images include first overlap portions, wherein two adjacent images of the second sequential images include second overlap portions, wherein the first sequential images correspond to a first three dimensional (3D) surface on the object at a first state and the second sequential images correspond to a second 3D surface on the object at a second state; deblurring the first sequential and second sequential images to obtain sharp focal plane images based on a blind deconvolution method; stitching the sharpened first sequential images and the sharpened second sequential images into a first sharp 3D image and a second sharp 3D image based on camera pose estimations by solving a perspective-n-point (PnP) problem using a refined robust weighted Levenberg Marquardt (RRWLM) algorithm, respectively; forming a first two-dimensional (2D) image and a second 2D image by unfolding, respectively, the first sharp 3D image and the second sharp 3D; and generating a displacement (strain) map image from the first 2D and second 2D images by performing a two-dimensional digital image correction (DIC) method.

Another embodiment of the present invention proposes a two-stage method based on PnP method and bundle adjustment principle for image fusion. Our method outperforms state-of-arts and achieves applicable image fusion accuracy for strain measurement by DIC analysis.

BRIEF DESCRIPTION OF THE DRAWING

The accompanying drawings, which are included to provide a further understanding of the invention, illustrate embodiments of the invention and together with the description serve to explain the principle of the invention.

FIGS. 4A, 4B and 4C show a schematic illustrating the pipeline of the image acquisition and the strain measurement framework, according to embodiments of the present invention;

FIG. 5 shows an algorithm describing refined robust weighted LM (RRWLM), according to embodiments of the present invention;

FIG. 6 shows the average errors of camera pose estimation and the PSNR of the image fusion results, according to embodiment of the present invention;

FIGS. 7A, 7B and 7C show comparison of strain maps of a small area, according to embodiments of the present invention;

FIGS. 8A, 8B and 8C show comparison of surface images based on different methods, according to embodiment of the present invention.

DETAILED DESCRIPTION OF THE PREFERRED EMBODIMENTS

Figure 1:
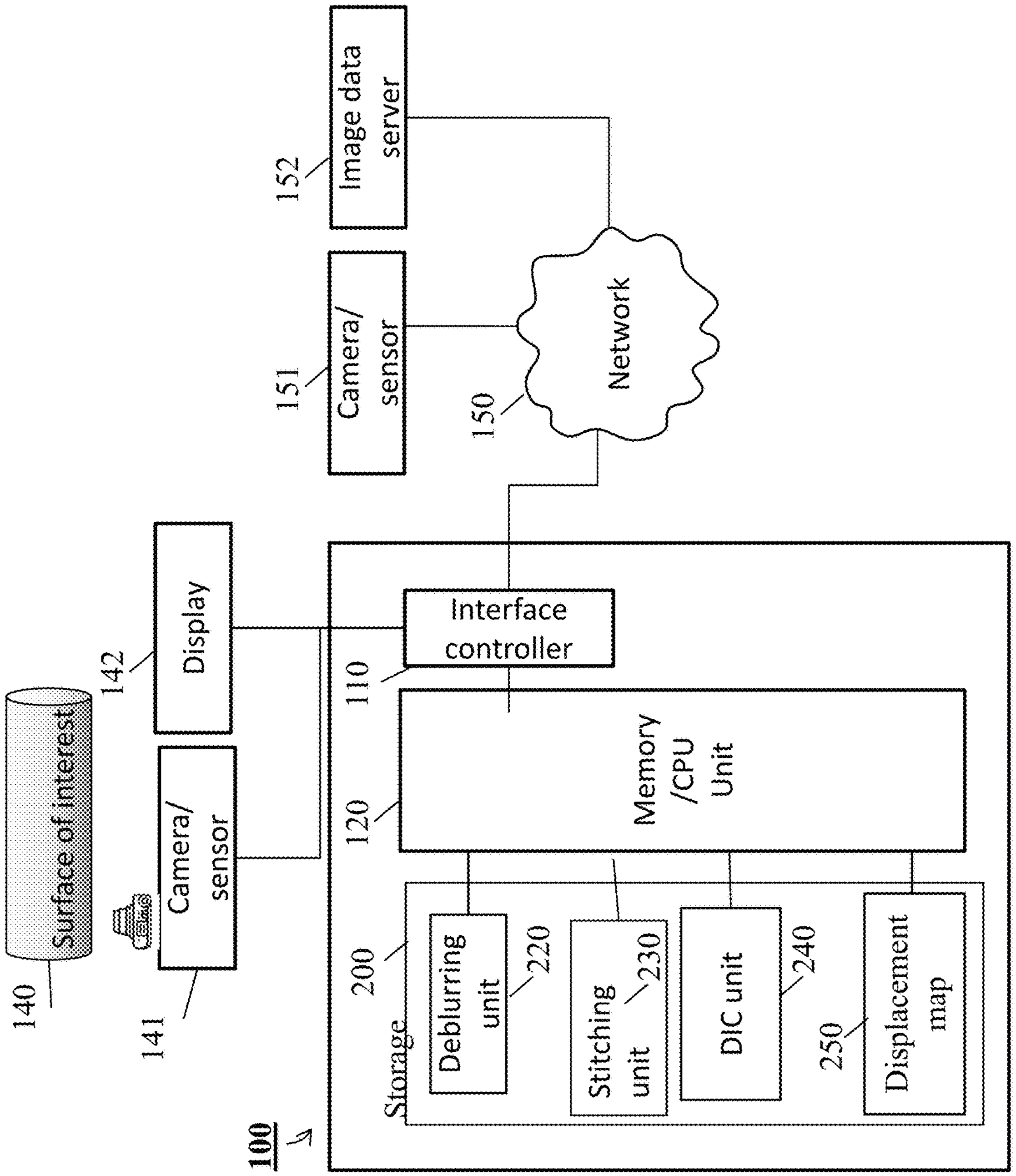
FIG. 1 shows an example illustrating an image processing device, according to embodiments of the present invention.

Various embodiments of the present invention are described hereafter with reference to the figures. It would be noted that the figures are not drawn to scale elements of similar structures or functions are represented by like reference numerals throughout the figures. It should be also noted that the figures are only intended to facilitate the description of specific embodiments of the invention. They are not intended as an exhaustive description of the invention or as a limitation on the scope of the invention. In addition, an aspect described in conjunction with a particular embodiment of the invention is not necessarily limited to that embodiment and can be practiced in any other embodiments of the invention.

We consider the strain measurement of a cylinder surface which is of interest in many applications. For image acquisition, a moving camera captures a sequence of images $$\{Y_i\}_{i=1}^{p}$$

for the cylindrical surface texture $U_b$ before deformation, and $$\{Y_i'\}_{i=1}^{q}$$

for $U_f$ after deformation, as illustrated in FIG. 4A, FIG. 4B and FIG. 4C. Each sequence consists of p (or q) images in order overlapping with their neighbors. Without loss of generality, we only show the model and analysis for the sequence $$\{Y_i\}_{i=1}^{p}$$

in the following description.

Since out-of-focus blur is a common image degradation phenomenon, we consider a six degree of freedom (6-DOF) pinhole camera model with a camera lens' point spread function (PSF) (blur kernel) $K \in \mathbb{R}^{(2r_g+1)\times(2r_g+1)}$, which is assumed to be a truncated Gaussian kernel:

$$K(x, y) = \begin{cases} \frac{1}{C_1}\exp\left(\frac{-(x^2+y^2)}{2\sigma^2}\right) & \sqrt{x^2+y^2} \le r_g \\ 0 & \sqrt{x^2+y^2} > r_g \end{cases} \tag{1}$$

where $r_g$ is the radius, $C_1$ is the normalization term to ensure the energy of the PSF $$\sum\nolimits_{x,y} \frac{1}{C_1}\exp\left(\frac{-(x^2+y^2)}{2\sigma^2}\right) = 1.$$

Then the captured images $$\{Y_i\}_{i=1}^{p}$$

can be modeled:

$$Y_i = K \circledast X_i,\ i = 1, 2, \ldots, p \tag{2}$$

where $\circledast$ denotes the convolution operation, $X_i \in \mathbb{R}^{m\times n}$ is the sharp camera focal plane image, and p is the total number of the images. Each pixel $x=[x, y]^T$ in $X_i$ is projected from a pixel $u=[x_u, y_u, z_u]^T$ on the 3D surface according to:

$$\begin{bmatrix} x \\ 1 \end{bmatrix} = \frac{1}{v}P_s\begin{bmatrix} R & T \\ 0 & 1 \end{bmatrix}\begin{bmatrix} u \\ 1 \end{bmatrix} = \frac{1}{v}\begin{bmatrix} f & 0 & 0 & 0 \\ 0 & f & 0 & 0 \\ 0 & 0 & 1 & 0 \end{bmatrix}\begin{bmatrix} R & T \\ 0 & 1 \end{bmatrix}\begin{bmatrix} x_u \\ y_u \\ z_u \\ 1 \end{bmatrix} \tag{3}$$

where $R \in \mathbb{R}^{3\times 3}$ and $T \in \mathbb{R}^{3}$ are the rotation matrix and the translation vector respectively, depending on the camera pose of $X_i$, v is a pixel-dependent scalar projecting the pixel to the focal plane, and $P_s$ is the perspective matrix of the camera.

Note that each image $Y_i$ ($Y'_i$) in the sequence covers a narrow field of the cylinder surface $U_b$ ($U_f$). Our goal is to recover the whole unfolded images of the curved surface based on $$\{Y_i\}_{i=1}^{p} \text{ and } \{Y_i\}_{i=1}^{q}$$

such that the strain on the cylindrical surface can be analyzed using 2D DIC. In the following descriptions, we will introduce our proposed framework including image deblurring, image fusion, and DIC, as illustrated in FIGS. 4A-4C.

Image Deblurring

The goal of this module is to recover sharp focal plane images $$\{X_i\}_{i=1}^{p}$$

and the unknown blur kernel K simultaneously from the blurry observations $$\{Y_i\}_{i=1}^{p}$$

in (2). To this end, we formulate the blind deconvolution problem as $$\min_{K,\{X_i\}_{i=1}^{p}} \sum_{i=1}^{p}\left(\frac{\beta}{2}\|Y_i - K \circledast X_i\|_F^2 + \sum_{j=1}^{m\cdot n}\|D_j X_i\|_2\right) + I_g(K) \tag{4}$$

where $\|\cdot\|_F$ represents the Frobenius norm of a matrix, $I_g(\cdot)$ is the indicator function to ensure K is a truncated Gaussian kernel, $D_j$ represents the derivative of $X_i$ at pixel j in both x and y directions, and β is a weight depending on the noise level of the image $Y_i$. The first term is a data fidelity term. The second term is a widely used regularization term total variation (TV) to preserve sharpness of the image. (4) is solved by alternating minimization with respect to K and $$\{X_i\}_{i=1}^{p}.$$

Especially, we update $$\{X_i\}_{i=1}^{p}$$

utilizing circular convolution with the periodic boundary assumption on $$\{X_i\}_{i=1}^{p}$$

for fast computation by FFT.

To obtain a great initialization $K_0$ of the blur kernel, we use Wiener Filter by minimizing the normalized sparsity measure in the possible region of σ as $$K_0 = \underset{K}{\operatorname{argmin}} \sum_{i=1}^{L} \frac{\|\nabla_x \overline{X}_i(K, Y_i)\|_1}{\|\nabla_x \overline{X}_i(K, Y_i)\|_2} + \frac{\|\nabla_y \overline{X}_i(K, Y_i)\|_1}{\|\nabla_y \overline{X}_i(K, Y_i)\|_2} \tag{5}$$

where $\overline{X}_i(K, Y_i)$=Weiner $(K, Y_i)$ is the filtered image of $Y_i$ with kernel K, $\nabla_x$, $\nabla_y$ denote the derivatives in x and y directions respectively, and L is the number of images used.

Image Fusion

In this module, we reconstruct the super-resolution texture over the 3D object curved surface using the deblurred sequence of images $$\{\hat{X}_i\}_{i=1}^{p}$$

for DIC analysis.

Camera Pose Estimation

Without loss of generality, we consider the problem of estimating a camera pose of the target deblurred image $\hat{X}_i$ by registering it with an overlapping reference image $\hat{X}_j$ for which the camera pose is known.

Firstly, we acquire the well-known SIFT feature point sets $$\Omega_i^{SIFT} = \{x_i\}$$

in the target image $\hat{X}_i$ and $$\Omega_j^{SIFT} = \{x_j\}$$

in the reference $\hat{X}_j$. Then we seek a set of matched feature points $$\mathcal{A}_{(j,i)} = \{(x_j^m, x_i^m) \mid x_j^m \in \Omega_j^{SIFT}, x_i^m \in \Omega_i^{SIFT}, m = 1, 2, \ldots\}$$

satisfying $$\|a(x_i^m) - a(x_j^m)\|_2 \le C_2 \min_{x \in \Omega_j^{SIFT} \backslash x_j^m} \|a(x_i^m) - a(x)\|_2 \quad (6)$$

where a(x) denotes the SIFT feature vector at the pixel x, $$\Omega_j^{SIFT} \backslash x_j^m,$$

is the set of $$\Omega_j^{SIFT}$$

excluding $$x_j^m$$

and $0<C_2\le1$ is a constant chosen to remove feature outliers, typically $C_2=0.7$.

We project each feature point $$x_j^m$$

in $\mathcal{A}_{(j,i)}$ to the 3D surface and get the corresponding set of $$\{u_j^m = (x_{uj}^m, y_{uj}^m, z_{uj}^m)\},$$

using (3) with the pose of $\hat{X}_j$ and the object geometry. Then the camera pose estimation problem becomes the widely known PnP problem to estimate the camera pose using the point set $$\mathcal{M}_{(j,i)} = \{(u_j^m, x_i^m)\}.$$

PnP problem can usually be formulated as a nonlinear sum of least squares problem. Considering that $r_3=r_1\times r_2$ holds in $R=[r_1, r_2, r_3]^T$ we use $$h = [r_1^\top, r_2^\top, T^\top]^\top$$

to denote unknown parameters of the camera pose. Then the camera pose $h_i$ associated with $\hat{X}_i$ can be achieved by solving:

$$\min_h g(h \mid \mathcal{M}_{(j,i)}) = \sum_{(u_j^m, x_i^m) \in \mathcal{M}_{(j,i)}} w_m \|\hat{x}_i(u_j^m, h) - x_i^m\|_2^2,$$

where $$\hat{x}_i(u_j^m, h)$$

is the projection result from the 3D point $$u_j^m$$

to the camera focal plane of $\hat{x}_i$ with respect to the camera pose h using (3), R is determined by $h_i$ as above, and $$w_m = \frac{1}{\|\hat{x}_i(u_j^m, h) - x_i^m\|_2^\alpha}$$

represents the inverse of the measurement error for the m-th feature pair, for m=1, . . . $|\mathcal{M}_{(j,i)}|$ and typically $\alpha=0.5$.

To solve this problem, we utilize the widely used Levenberg-Marquardt algorithm (LM) with conjunction of the projection operator $\mathcal{P}(\cdot)$ to keep the orthonormality of the rotation matrix R. Given the present estimation $h^{(t)}$, one step update $h^{(t+1)}=h^{(t)}+\Delta h$ for (7) by LM can be seen as the interpolation of the greedy descent and Gauss-Newton update with $$\Delta h=(H+\lambda \mathrm{diag}(H))^{-1}b, \quad (8)$$

where $$H = \sum_{\mathcal{M}_{(j,i)}} w_m \frac{\nabla \hat{x}_i(u_j^m, h)}{\nabla h} \frac{\nabla \hat{x}_i(u_j^m, h)^\top}{\nabla h}$$

is the Hessian matrix, $$b = \sum_{\mathcal{M}_{(j,i)}} w_m \frac{\nabla \hat{x}_i(u_j^m, h)^\top}{\nabla h}\left[x_i^m - \hat{x}_i(u_j^m, h)\right]$$

and λ is a parameter varying with iterations to determine the interpolation level accordingly.

The projection operator $\mathcal{P}$ (h) is defined to orthonormalize $r_1$, $r_2$. We revise the method which approximately apportions half of the error to $$r_1' \text{ and } r_2'$$

as $$\begin{bmatrix} r_1' \\ r_2' \end{bmatrix} := \begin{bmatrix} r_1 - \frac{r_2^\top r_1}{2} \cdot r_2 \\ \left[1 + \left(\frac{r_1^\top r_2}{2}\right)^2\right] r_2 - r_1^\top \frac{r_2}{2} \cdot r_1 \end{bmatrix} \tag{9}$$

with output orthonormalized $r_1$, $r_2$ being $$r_1'/\|r_1'\|_2,\ r_2'/\|r_2'\|_2.$$

For each image $\hat{X}_i$ in the sequence $$\{\hat{X}_i\}_{i=2}^p,$$

using the previous image $\hat{X}_{i-1}$ as the reference image, we estimate its camera pose $h_i$ by iteratively update the camera pose using (8) with matching feature set $\mathcal{M}_{(i-1,i)}$ followed by the projection operation $\mathcal{P}(\cdot)$ and an evaluation step.

Camera Pose Refinement and Image Fusion

Motivated by the bundle adjustment principle, we propose to further refine camera pose estimations to take advantage of more useful matching feature pairs. With this observation, for the i-th image $\hat{X}_i$, we search feature pairs in all the previous images and form the index set $\mathcal{L}_i=\{l|l<i, \hat{X}_l \cap \hat{X}_i=0\}$ of images overlapping with $\hat{X}_i$. Using the same condition in (6) for the feature point matching between the target image $\hat{X}_i$ and each image with index in the set $\mathcal{L}_i$, we obtain the union of matching feature sets $\cup_{j\in\mathcal{A}_i}\mathcal{A}_{(j,i)}$. FIG. 5 shows an algorithm describing refined robust weighted LM (RRWLM), according to embodiments of the present invention. Initialized with the estimated camera poses $$\{\hat{h}_i\}_{i=2}^p$$

using (9), the proposed method RRWLM alternatively updates one pose while keeping other poses fixed, as summarized in FIG. 5. Finally, with accurately estimated camera poses for the sequence of images $$\{\hat{X}_i\}_{i=1}^p(\{\hat{X}_i'\}_{i=1}^q$$

after deformation), we project all the pixels in these images back to the 3D surface and utilize the linear interpolation to achieve the super-resolution surface texture $\hat{U}_b(\hat{U}_f)$ and unfold it to the final 2D image $$\hat{U}_b'(\hat{U}_f').$$

DIC

From previous modules, we obtain the reference $$\hat{U}_b'$$

and the deformed image $$\hat{U}_f'$$

of large visual fields of the 3D surface from two sequences of images $$\{Y_i\}_{i=1}^p \text{ and } \{Y_i'\}_{i=1}^q$$

of narrow visual fields as inputs, respectively. The basic principle of DIC is the tracking of the chosen points between two images recorded before and after deformation for displacement. The sub-level displacement can be computed by tracking pixels in the sparse grid defined on the reference image, thanks to feature tracking methods. Under the assumption that the displacement is small in most engineering applications, our DIC module enables the computation of strain measurement by displacement in different smooth levels based on the programming.

NUMERICAL EXPERIMENTS

Experimental Settings

For the 3D surface under test, two sequences of images are captured, before and after deformation respectively, by a moving camera as illustrated in FIGS. 4A-4C, where the region outside the cylinder is assumed to be black. The 3D cylinder is of radius r=500 mm and of height H=80 mm. The camera moving trajectory approximately lies in a co-axial virtual cylinder round surface of radius $r_2$=540 mm. The camera poses for all captured images are not known exactly except for the first image due to random perturbations.

For super-resolution reconstruction of the surface texture, the camera moves in a snake scan pattern, taking 5 images as it moves along the axial direction and then moving forward in the tangential direction for the next 5 images along the axial direction, and so on. We collect a total of p=160 images of size m×n=500×600 for each sequence. Both sequences cover the same area, about 60 degree of the cylinder surface with slightly different camera starting positions before and after deformation, which can be directly extend to the 360° surface.

Implementation and Evaluation

To examine our proposed framework and the essential PnP method for image fusion, we consider 5 baseline methods consisting of a classical iterative method LHM, four state-of-art non-iterative methods EPnP+GN, OPnP+

LM, ASPnP, and REPPnP rejecting outliers. For comparison, we denote the non-refined estimation process using (9) as robust weighted LM (RWLM) and the refined robust weighted LM as RRWLM in Alg. 1, as shown in FIG. 5. All the baseline methods use the same matching feature set. Both LHM and RWLM use their own camera pose estimation of the previous image as initialization for present image. RRWLM runs with $$\mathcal{L}_i = \{l < . i, |l - i| \le 30\}_{i=2}^{p}, M = 20,$$

and other parameters. To evaluate the accuracy of the camera pose estimation $\{\hat{R}, \hat{T}\}$, we compute the rotation and translation error together with the ground truth $\{R, T\}$ as $\|[\hat{R}-R, \hat{T}-T]\|_2$ and widely used PSNR for the image stitching results $$\hat{U}'_b \text{ and } \hat{U}'_f.$$

Firstly, using only the first 10 images of each sequence of images, $$\text{i.e., } \{\hat{X}_i\}_{i=1}^{10} \text{ and } \{\hat{X}'_i\}_{i=1}^{10}$$

for the reference and deformed texture, we show the average of camera pose estimation errors and the average PSNR of the stitched surface texture images $$\hat{U}'_b \text{ and } \hat{U}'_f$$

with comparison to the best 3 baseline methods in FIG. 6. The strain analysis results by DIC are presented in FIGS. 7A, 7B and 7C. We observe that the proposed methods have competitive accuracy compared to existing methods when the number of images for fusion is relatively small.

FIG. 6 shows the average errors of camera pose estimation and the PSNR of the image fusion results, according to embodiment of the present invention. The average error of camera pose estimation and the PSNR of the image fusion results are shown using all 160 images or only the first 10 images in each sequence. The figure shows the same quantities using all images in the sequence of size p=q=160 instead. Compared to RWLM, the proposed method RRWLM improves the performance by camera pose refinement, and it also significantly outperforms the baseline methods when stitching a large number of images. The main reason of improvement is that the proposed method RRWLM reduces the irreversible camera pose error accumulation in the targeted scenarios.

Figure 9A:
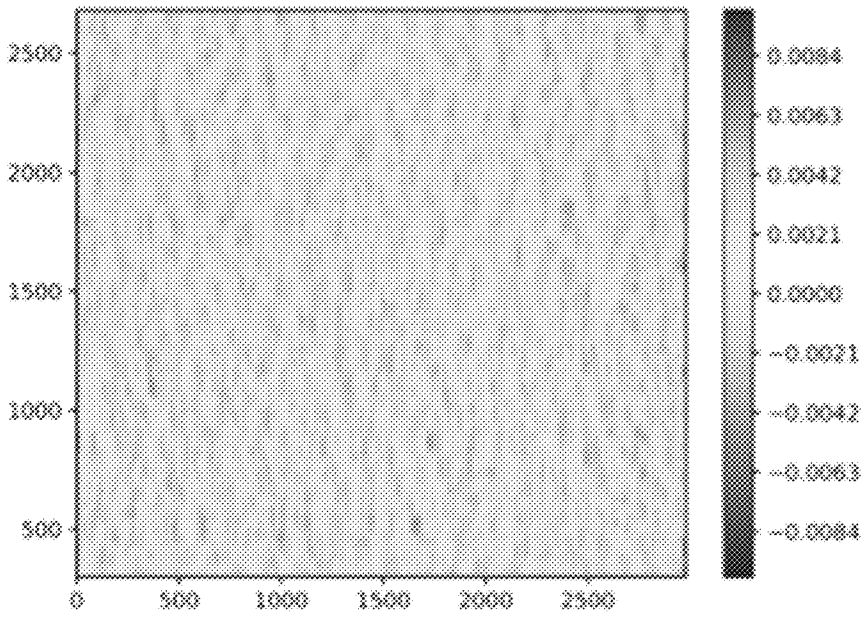
FIGS. 9A and 9B show comparison of strain maps of a large area, according to embodiment of the present invention.
Figure 9B:
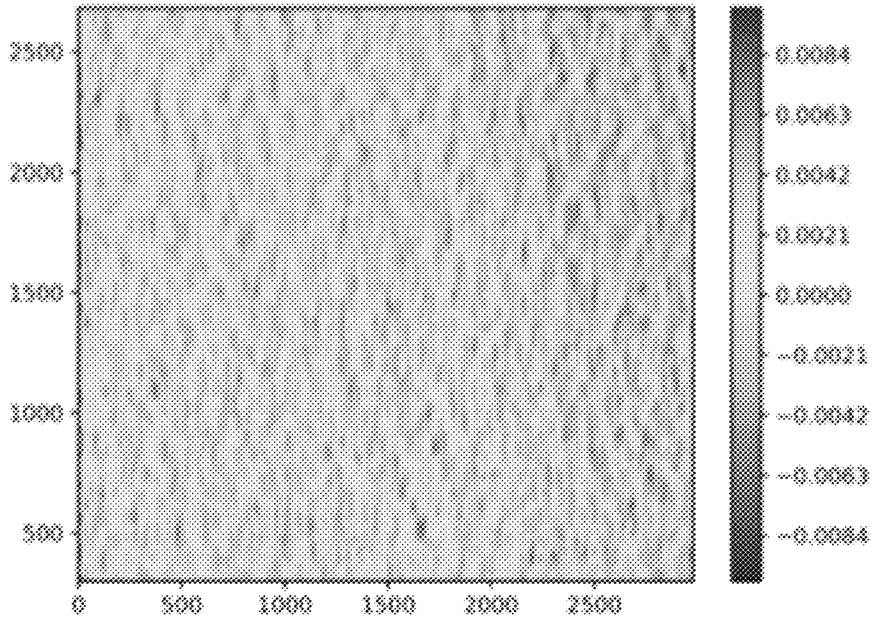

For illustration, the image fusion results for the reference image $$\hat{U}'_b$$

via the proposed RRWLM are shown in FIG. 8B with comparison to the ideal image shown in FIG. 8A and the best baseline method OPnP+LM in FIG. 8C. As the image fusion results by existing methods are not applicable anymore for reasonable strain measurement, we only compare the strain measurement result by DIC using RRWLM with the ground truth in FIGS. 9A-9B (only display the strain in xx direction owing to space limit). It implies that the proposed framework achieves at least sub-pixel and applicable accuracy of image fusion results for strain measurement even if a large number of images are under fusion.

Accordingly, some embodiments of the present invention provide an end-to-end fusion-based DIC framework for 2D strain measurement along curved surface of 3D objects in large size. To address the challenges of single image's narrow visual field of the surface, we incorporate the image fusion principle and decouple the image fusion problem into a sequence of perspective-n-point (PnP) problems. The proposed PnP method with conjunction with bundle adjustment accurately recovers the 3D surface texture stitched by a large number of images and achieves applicable strain measurement by DIC method. Numerical experiments are conducted to show its outperformance with comparisons to existing methods.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

FIG. 1 is a schematic diagram illustrating a strain measurement system 100 for generating a displacement map of a surface of interest 140, according to embodiments of the present disclosure. In some cases, the displacement map can be a strain map.

The strain measurement system 100 may include a network interface controller (interface) 110 configured to receive images from a camera/sensor 141 and display 142 images. The camera/sensor 141 is configured to take overlapped images of the surface of interest 140.

Further, the strain measurement system 100 may include a memory/CPU unit 120 to store computer-executable programs in a storage 200. The computer-executable programs/ algorithms may include an image deblurring unit 220, an image stitching unit 230, a digital image correlation (DIC) unit 240, and an image displacement map unit 250. The computer-executable programs are configured to connect with the memory/CPU unit 120 that accesses the storage 200 to load the computer-executable programs.

Further, the Memory/CPU unit 120 is configured to receive images (data) from the camera/sensor 151 or an image data server 152 via a network 150 and perform the displacement measurement 100 discussed above.

Further, the strain measurement system 100 may include at least one camera that is arranged to capture images of the surface of interest 140, and the at least one camera may transmit the captured images to a display device 142 via the interface.

Figure 2:
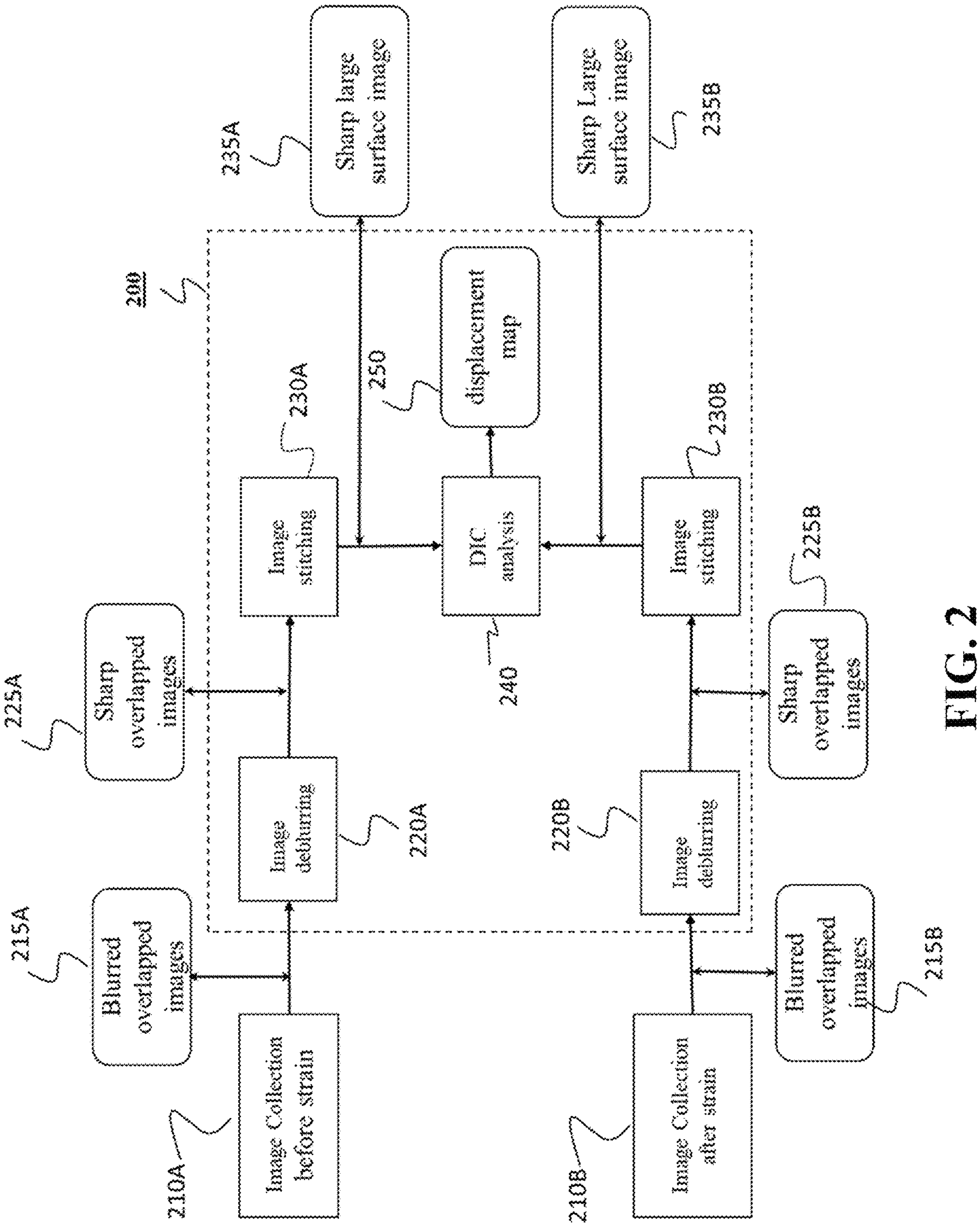
FIG. 2 shows a block diagram illustrating image processing steps for generating a strain map, according to embodiments of the present invention.

FIG. 2 shows a schematic diagram indicating the storage 200 for generating displacement map using images of the surface captured by the camera/sensor according to some embodiments of the present disclosure. The storage module 200 uses images captured before and after strain, using labels end with A and B respectively, for generating displacement map 250. First, blurred overlapped images 215A are captured by the image collection process before strain 210A, after image debluring process 220A, images are sharpened as sharp overlapped images 225A. The sharp overlapped images are then stitched together using the image stitching process 230A to form a large sharp surface image 235A. Similarly, images captured after strain 210B are processed via image deblurring 220B, image stitching 230B to form a large sharp surface image 235B. Images 235A and 235B are compared using DIC analysis 240 to generate a displacement map 250 indicating the strain received by the surface.

Figure 3A:
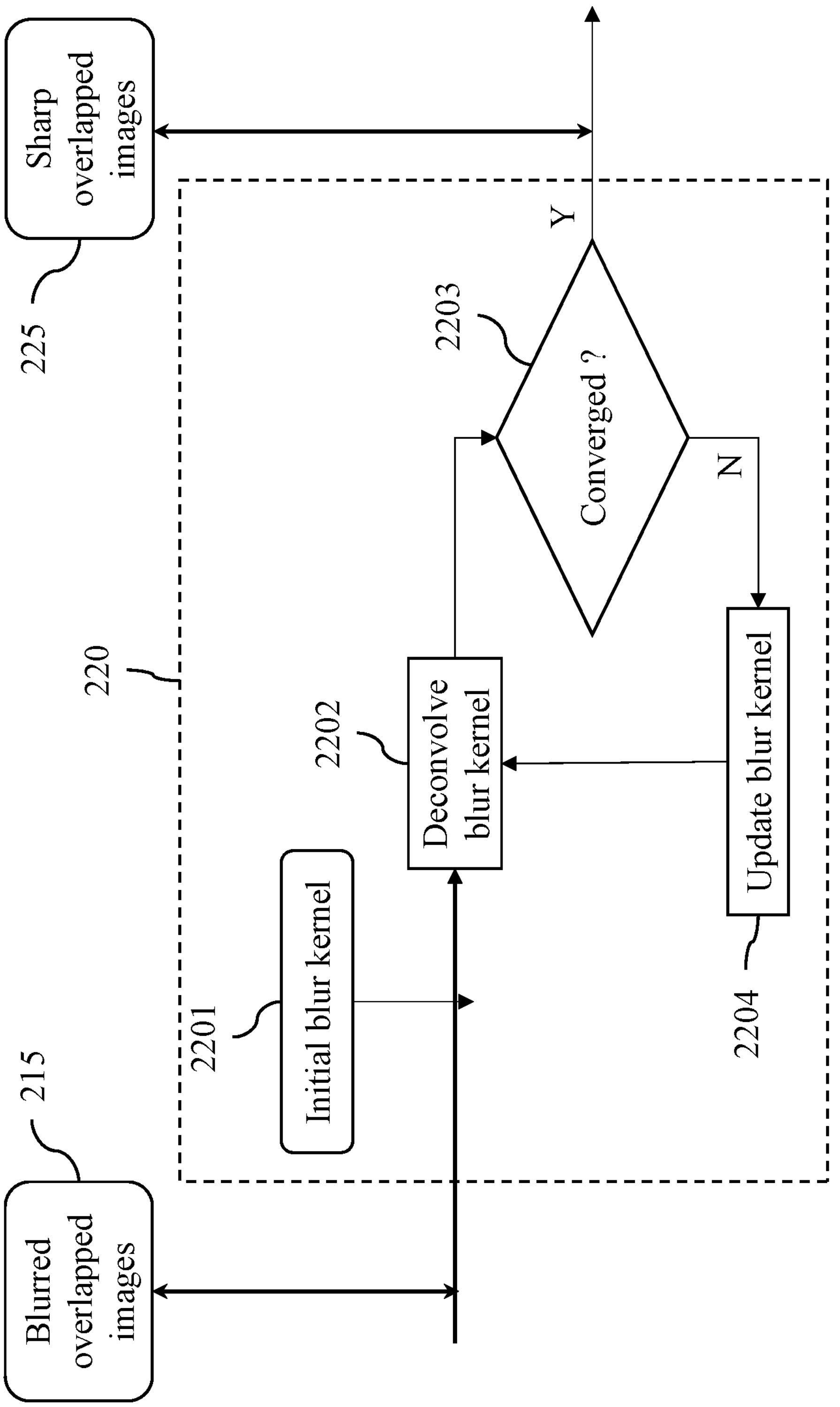
FIG. 3A shows a block diagram illustrating an image deblurring module used in the image processing device, according to embodiments of the present invention.

FIG. 3A shows a schematic diagram indicating the image deblurring module 220 for deblurring images of the surface captured by the camera/sensor according to some embodiments of the present disclosure. First, an initial blur kernel 2201 is estimated using Wiener Filter by minimizing the normalized sparsity measure as indicated in (5). The image is then sharpened by solving an iterative blind deconvolution problem (4). In each iteration, after deconvolving the blur kernel 2202 with the captured images 215, sharpened images are generated, and used to compare with the previous sharpened images to check convergence 2203. If their differences (or relative errors) are small, meaning the algorithm converged, the image deblurring module 220 outputs the current sharpened images as sharp overlapped images 225. Otherwise, the blur kernel is updated 2204 by minimizing (4) and used for the next iteration deconvolution process 2202 until the algorithm converges.

Figure 3B:
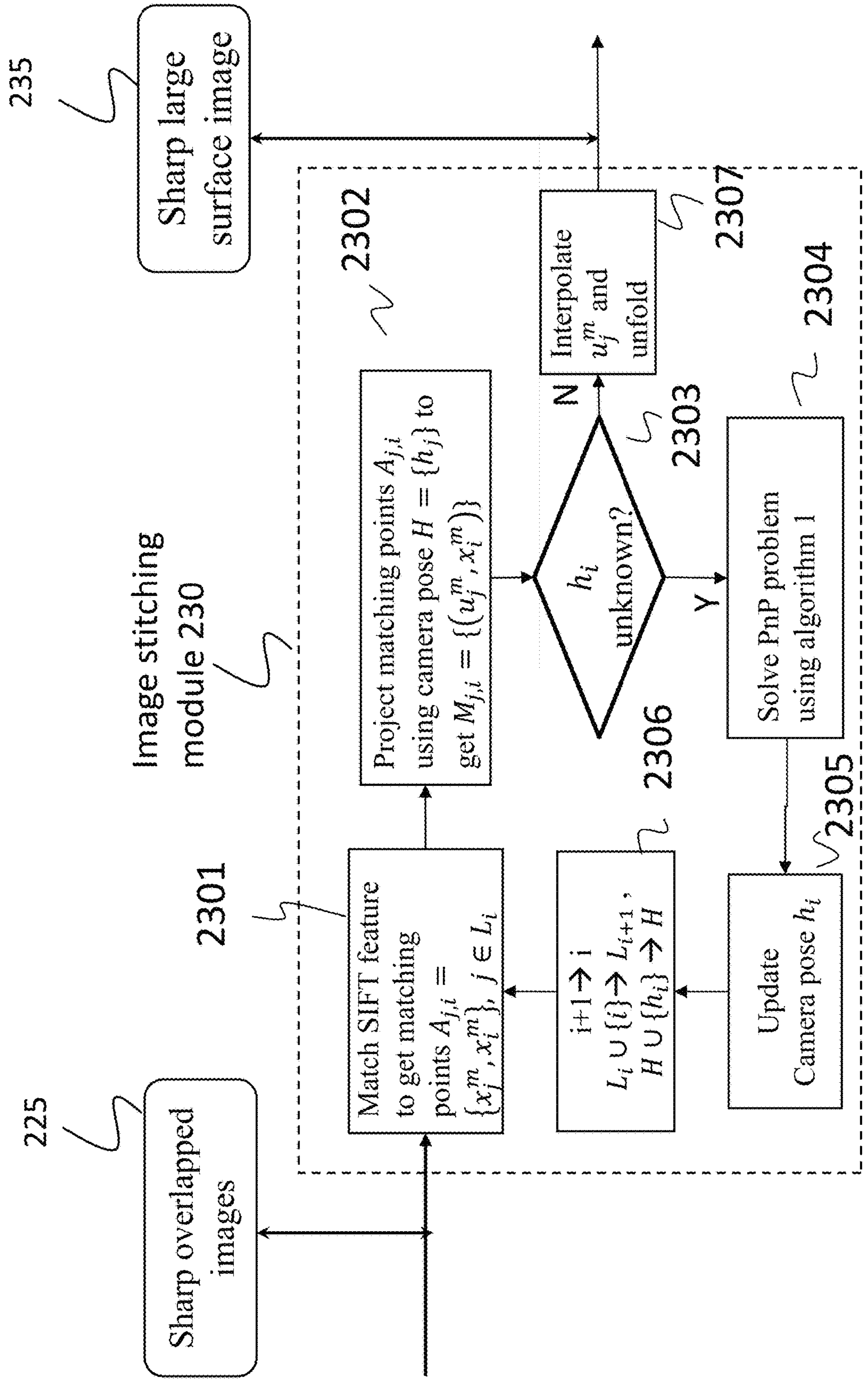
FIG. 3B shows a block diagram illustrating an image stitching module used in the image processing device, according to embodiments of the present invention.

FIG. 3B shows a schematic diagram indicating the image stitching module 230 for stitching sharp overlapped images 225 to a large sharp surface image according to some embodiments of the present disclosure. First, to stitch the ith image with its neighborhood jth image in its neighborhood image set $L_i$, wherein the jth image camera position $h_j$ is known, matching points $A_{j,i}$ are determined using match SIFT feature 2301. With known camera pose $h_j$, matching points on the jth image are projected to the cylinder surface 2302. If the ith image camera position is unknown 2303, a PnP problem is solved 2304 using algorithm 1 to estimate the camera pose hi, the known camera pose set H is updated 2305 by including $h_i$, and the neighborhood image set $L_i$ is updated 2306 by including the ith image. Then the (i+1)th image is considered to stitching to its neighborhood images. If the camera pose associated with all images are determined, meaning $h_i$ unknown 2303 is not true, images are projected to the cylinder surface using their camera pose, and interpolated 2307 to generate a large sharp surface image 235.

The above-described embodiments of the present invention can be implemented using hardware, software, or a combination of hardware and software.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

We claim:

1. An image processing device for measuring strain of an object, comprising:

an interface configured to acquire first sequential images and second sequential images, wherein two adjacent images of the first sequential images include first overlap portions, wherein two adjacent images of the second sequential images include second overlap portions, wherein the first sequential images correspond to a first three dimensional (3D) surface on the object at a first state and the second sequential images correspond to a second 3D surface on the object at a second state;

a memory configured to store computer-executable programs including an image deblurring method, a pose refinement method, a fusion-based correlation method, a strain-measurement method, and an image correction method; and a processor configured to execute the computer-executable programs, wherein the processor performs steps of:

deblurring the first sequential and second sequential images to obtain sharpened first sequential images and sharpened second sequential images based on a blind kernel deconvolution method;

stitching the sharpened first sequential images and the sharpened second sequential images into a first sharp 3D image and a second sharp 3D image based on camera pose estimations using a refined robust weighted Levenberg Marquardt (RRWLM) algorithm, respectively, wherein the RRWLM is performed by a Levenberg-Marquardt algorithm (LM) with conjunction of a projection operator to keep an orthonormality of a rotation matrix for each pixel of the images, wherein the camera pose estimations are obtained by iteratively updating using the RRWLM algorithm, a first set of camera poses corresponding to the sharpened first sequential images and a second set of camera poses corresponding to the sharpened second sequential images using a first matching feature set for the sharpened first sequential images and a second matching feature set for the sharpened second sequential images, wherein to update the first set of camera poses, the RRWLM algorithm alternatively updates each pose of the first set of camera poses while keeping other poses of the first set of camera poses fixed, and wherein to update the second set of camera poses, the RRWLM algorithm alternatively updates each pose of the second set of camera poses while keeping other poses of the second set of camera poses fixed;

forming a first two-dimensional (2D) image and a second 2D image by unfolding, respectively, the first sharp 3D image and the second sharp 3D image; and generating a displacement map from the first 2D and second 2D images by performing a two-dimensional digital image correlation (DIC) method.

2. The image processing device of claim 1, wherein the first state is a reference condition of the object that has not been operated within an initial time period and the second state is a post-condition of the object that has been operated for an operation time period.

3. The image processing device of claim 1, further comprises analyzing local strain on the surface of the object using the displacement map.

4. The image processing device of claim 1, wherein the camera pose estimation is performed by solving a perspective-n-point (PnP) problem.

5. The image processing device of claim 4, wherein the PnP problem uses matching points based on scale-invariant-feature transform (SIFT) features.

6. The image processing device of claim 1, wherein the deblurring is performed by a blind deconvolution method.

7. The image processing device of claim 1, wherein the displacement map is computed based on a feature tracking method.

8. The image processing device of claim 1, wherein the first and second sequential images are acquired from a curved surface of the object.

9. The image processing device of claim 1, wherein the object is a cylinder shape.

10. The image processing device of claim 1, wherein the first sequential images are acquired before the object is deformed and the second sequential images are acquired after the object is deformed.

11. The image processing device of claim 1, wherein a camera pose of at least one image of the first sequential images is known, and wherein a camera pose of at least one image of the second sequential images is known.

12. The image processing device of claim 1, wherein the update of the first set of camera poses and the second set of camera poses comprises a combination of interpolation of greedy descent and Gauss-Newton update at each step of the RRWLM algorithm.

13. An image processing method for measuring strain of an object comprising:

acquiring first sequential images and second sequential images, wherein two adjacent images of the first sequential images include first overlap portions, wherein two adjacent images of the second sequential images include second overlap portions, wherein the first sequential images correspond to a first three dimensional (3D) surface on the object at a first state and the second sequential images correspond to a second 3D surface on the object at a second state;

deblurring the first sequential and second sequential images to obtain sharpened first sequential images and sharpened second sequential images based on a blind deconvolution method;

stitching the sharpened first sequential images and the sharpened second sequential images into a first sharp 3D image and a second sharp 3D image based on camera pose estimations using a refined robust weighted Levenberg Marquardt (RRWLM) algorithm, respectively, wherein the RRWLM is performed by a Levenberg-Marquardt algorithm (LM) with conjunction of a projection operator to keep an orthonormality of a rotation matrix for each pixel of the images, wherein the camera pose estimations are obtained by iteratively updating using the RRWLM algorithm, a first set of camera poses corresponding to the sharpened first sequential images and a second set of camera poses corresponding to the sharpened second sequential images using a first matching feature set for the sharpened first sequential images and a second matching feature set for the sharpened second sequential images, wherein to update the first set of camera poses, the RRWLM algorithm alternatively updates each pose of the first set of camera poses while keeping other poses of the first set of camera poses fixed, and wherein to update the second set of camera poses, the RRWLM algorithm alternatively updates each pose of the second set of camera poses while keeping other poses of the second set of camera poses fixed;

forming a first two-dimensional (2D) image and a second 2D image by unfolding, respectively, the first sharp 3D image and the second sharp 3D image; and generating a displacement map from the first 2D and second 2D images by performing a two-dimensional digital image correlation (DIC) method.

14. The method of claim 13, wherein the first state is a reference condition of the object that has not been operated within an initial time period and the second state is a post-condition of the object that has been operated for an operation time period.

15. The method of claim 13, further comprises analyzing local strain on the surface of the object using the displacement map.

16. The method of claim 13, wherein the camera pose estimation is performed by solving a perspective-n-point (PnP) problem.

17. A non-transitory computer readable medium that comprises program instructions that causes a computer to perform the method comprising:

acquiring first sequential images and second sequential images, wherein two adjacent images of the first sequential images include first overlap portions, wherein two adjacent images of the second sequential images include second overlap portions, wherein the first sequential images correspond to a first three dimensional (3D) surface on the object at a first state and the second sequential images correspond to a second 3D surface on the object at a second state;

deblurring the first sequential and second sequential images to obtain sharpened first sequential images and sharpened second sequential images based on a blind deconvolution method;

stitching the sharpened first sequential images and the sharpened second sequential images into a first sharp 3D image and a second sharp 3D image based on camera pose estimations using a refined robust weighted Levenberg Marquardt (RRWLM) algorithm, respectively, wherein the camera pose estimations are obtained by iteratively updating using the RRWLM algorithm, a first set of camera poses corresponding to the sharpened first sequential images and a second set of camera poses corresponding to the sharpened second sequential images using a first matching feature set for the sharpened first sequential images and a second matching feature set for the sharpened second sequential images, wherein to update the first set of camera poses, the RRWLM algorithm alternatively updates each pose of the first set of camera poses while keeping other poses of the first set of camera poses fixed, and wherein to update the second set of camera poses, the RRWLM algorithm alternatively updates each pose of the second set of camera poses while keeping other poses of the second set of camera poses fixed;

forming a first two-dimensional (2D) image and a second 2D image by unfolding, respectively, the first sharp 3D image and the second sharp 3D image; and generating a displacement map from the first 2D and second 2D images by performing a two-dimensional digital image correlation (DIC) method.

18. The computer readable medium of claim 17, wherein the first state is a reference condition of the object that has not been operated within an initial time period and the second state is a post-condition of the object that has been operated for an operation time period.

19. The computer readable medium of claim 17, further comprises analyzing local strain on the surface of the object using the displacement map.

20. The computer readable medium of claim 17, wherein the camera pose estimation is performed by solving a perspective-n-point (PnP) problem.

* * * * *